(12) United States Patent
Panag et al.

(10) Patent No.: US 12,130,936 B2
(45) Date of Patent: Oct. 29, 2024

(54) SYSTEMS AND METHODS FOR CONTROLLING ACCESS TO DATA RECORDS

(71) Applicant: The Toronto-Dominion Bank, Toronto (CA)

(72) Inventors: Harjot Singh Panag, Brampton (CA); Nipaben Shelat, Brampton (CA); Karandeep Puri, Toronto (CA); Kevin Wayne Faragher, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 601 days.

(21) Appl. No.: 17/376,254

(22) Filed: Jul. 15, 2021

(65) Prior Publication Data

US 2023/0020445 A1    Jan. 19, 2023

(51) Int. Cl.
*G06F 21/62* (2013.01)
*G06F 21/32* (2013.01)
*G06V 40/16* (2022.01)

(52) U.S. Cl.
CPC ......... *G06F 21/6227* (2013.01); *G06F 21/32* (2013.01); *G06V 40/172* (2022.01); *G06F 2221/2111* (2013.01)

(58) Field of Classification Search
CPC .............. G06F 21/6227; G06F 21/32; G06F 2221/2111; G06V 40/172
See application file for complete search history.

(56) References Cited

U.S. PATENT DOCUMENTS

| | | | |
|---|---|---|---|
| 9,189,788 B1 | 11/2015 | Robinson et al. | |
| 10,452,897 B1 * | 10/2019 | Benkreira | G06V 20/62 |
| 10,692,085 B2 | 6/2020 | Zagarese et al. | |
| 2018/0183789 A1 * | 6/2018 | Tischart | H04L 63/0272 |
| 2019/0042719 A1 * | 2/2019 | Miu | H04L 63/0861 |
| 2019/0173873 A1 | 6/2019 | Brown et al. | |
| 2020/0410076 A1 | 12/2020 | Tussy | |

* cited by examiner

*Primary Examiner* — Hee K Song
(74) *Attorney, Agent, or Firm* — Rowand LLP

(57) ABSTRACT

A computer-implemented method is disclosed. The method includes: detecting a trigger event associated with a data record; in response to detecting the trigger event, enabling an access control for the data record, the access control defining one or more restrictions on accessing the data record; receiving at least one biometric data capture of a user and a digital form of at least one identification document associated with the user; obtaining verification results representing an identity verification status of the user based on a document verification process using the at least one biometric data capture and the digital form; in response to determining that the verification results satisfy first conditions: verifying user-inputted data based on contents of the at least one identification document; and in response to the verifying, disabling the access control for the data record.

20 Claims, 6 Drawing Sheets

SYSTEMS AND METHODS FOR CONTROLLING ACCESS TO DATA RECORDS

TECHNICAL FIELD

The present disclosure relates to data processing systems and, in particular, to systems and methods for managing access to data records.

BACKGROUND

In network computing, a host may maintain a protected resource, such as a private database, that is accessible to clients. Typically, the host may operate an access control system for enforcing security and privacy requirements of the protected resource. In particular, the host may implement an access control process for the protected resource, by defining an authorization policy, which specifies the operations that different clients are allowed to execute when accessing the protected resource, and configuring user permissions to enforce the authorization policy.

A protected resource may include client data for a plurality of clients. For example, client data may be stored in one or more data records associated with a client that are maintained at the protected resource. A data record may be accessed to obtain, add to, modify, or delete client data, execute or authorize certain operations, and/or change or update account settings. Such actions may only be initiated by authorized representatives of the client. Access controls may be implemented to ensure that only the individuals having the requisite permissions may perform or authorize actions associated with a client account at the protected resource.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
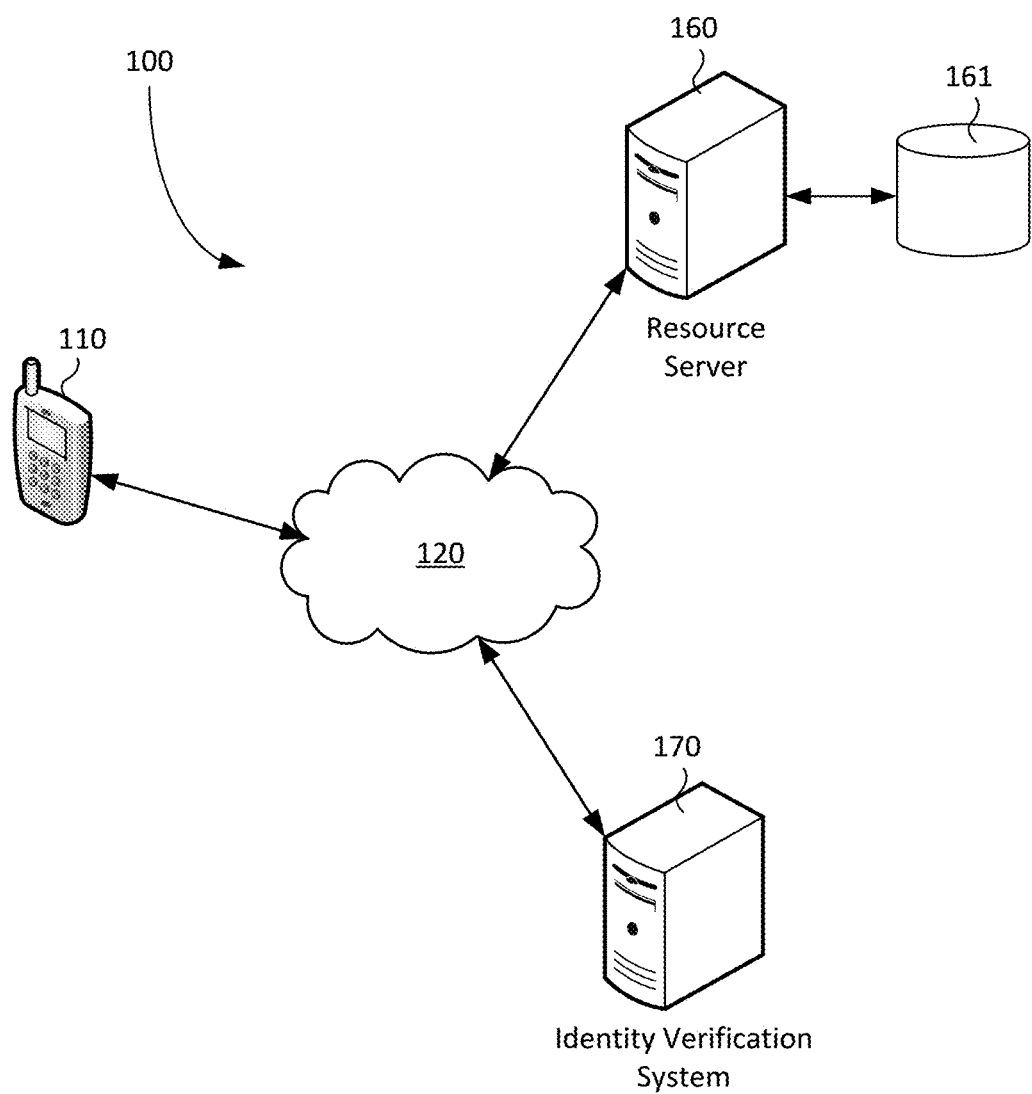
FIG. 1 is a schematic diagram illustrating an operating environment of an example embodiment of the present disclosure.

In one aspect, the present disclosure describes a computing system. The computing system includes a processor, a communications module coupled to the processor, and a memory coupled to the processor. The memory stores instructions that, when executed, configure the processor to: detect a trigger event associated with a data record; in response to detecting the trigger event, enable an access control for the data record, the access control defining one or more restrictions on accessing the data record; receive at least one biometric data capture for a user and a digital form of at least one identification document associated with the user; obtain verification results representing an identity verification status of the user based on a document verification process using the at least one biometric data capture and the digital form; in response to determining that the verification results satisfy first conditions: verify user-inputted data based on contents of the at least one identification document; and in response to the verifying, disable the access control for the data record.

In some implementations, the at least one biometric data capture may include a facial image capture and the digital form may include a scan of the at least one identification document.

In some implementations, detecting the trigger event may include detecting at least one unsuccessful authentication attempt in connection with access of the data record.

In some implementations, obtaining the verification results may include: transmitting, to a remote document verification system, the at least one biometric data capture and the digital form; and receiving, from the remote document verification system, an indicator representing the identity verification status of the user.

In some implementations, the indicator may comprise a numerical authentication score associated with the at least one identification document and determining that the verification results satisfy first conditions may include determining that the numerical authentication score exceeds a defined threshold value.

In some implementations, the access control may include a temporary restriction on accessing at least a subset of all features associated with the data record.

In some implementations, the trigger event may include receiving a request to generate a new data record for an entity that satisfies a defined location criterion.

In some implementations, the defined location criterion may relate to a current location associated with the entity relative to a defined first location.

In some implementations, verifying user-inputted data based on contents of the at least one identification document may include performing document comparison based on the at least one identification document and previously stored customer profile data associated with the data record.

In some implementations, disabling the access control for the data record may include identifying a subset of access restrictions imposed on the data record to disable based on the verifying.

In another aspect, a computer-implemented method is disclosed. The method includes: detecting a trigger event associated with a data record; in response to detecting the trigger event, enable an access control for the data record, the access control defining one or more restrictions on accessing the data record; receiving at least one biometric data capture for a user and a digital form of at least one identification document associated with the user; obtaining verification results representing an identity verification status of the user based on a document verification process using the at least one biometric data capture and the digital form; in response to determining that the verification results satisfy first conditions: verifying user-inputted data based on contents of the at least one identification document; and in response to the verifying, disabling the access control for the data record.

In yet another aspect, a non-transitory computer readable storage medium is disclosed. The computer readable storage medium contains instructions thereon which, when executed by a processor, configure the processor to: detect a trigger event associated with a data record; in response to detecting the trigger event, enable an access control for the data record, the access control defining one or more restrictions on accessing the data record; receive at least one biometric data capture for a user and a digital form of at least one identification document associated with the user; obtain verification results representing an identity verification status of the user based on a document verification process using the at least one biometric data capture and the digital form; in response to determining that the verification results satisfy first conditions: verify user-inputted data based on contents of the at least one identification document; and in response to the verifying, disable the access control for the data record.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A protected resource, such as a private database, may contain sensitive client data. For example, data records storing client data associated with a plurality of client accounts may be maintained at an access-restricted database. Access to the data records is restricted to authorized entities associated with the clients. In particular, account operations in connection with the data records may be initiated by only those entities that have express authorization (e.g., by an owner of the client account) for those operations. Examples of such account operations may include: initializing one or more data records in association with a client account; transferring data to one or more other data records; adding to, modifying, or deleting client data; and updating account or profile settings for a client account.

An access control system for a protected resource may require different types of authentications for different account operations associated with client accounts. For example, a user may be prompted to provide additional credentials (i.e., stronger authentication) when they request access to certain account operations or sensitive client data/resources. Traditional mechanisms for identity proofing often involve in-person interaction between a requesting entity (e.g., customer) and an administrator of the access control system. The requesting entity is required to submit one or more pieces of identity documents for manual verification by the administrator. Upon successful verification, the requested access is granted to the requesting entity.

Assisted identity proofing (e.g., in-person verification) generally imposes an undesirable burden on the requesting entity. In-person visits can be time-consuming and, in some cases, impractical (e.g., foreign residents). Furthermore, identity proofing alone does not ensure secure management of data records containing sensitive client data. Indeed, user authentication may be a necessary, but not a sufficient, condition for safeguarding access to data records associated with users.

The present application discloses a system for controlling access to data records that leverages identity verification processes. The system detects trigger events associated with data records and in response to the detecting, enables suitable access controls defining restrictions on accessing the data records. The system receives biometric data capture and digital form of one or more identity identification documents and obtains verification results of a document verification process based on the biometric data capture and the digital form. Upon determining that the verification results satisfy defined conditions, the system verifies user-inputted data based on contents of the identification document(s) and selectively disables access controls associated with the data records.

The present application also discloses techniques for maintaining security profile data for users that are associated with a protected resource. Digital credentials, or digital forms of identity documents, of users may be validated and stored in association with the users. In particular, credentials that are determined to satisfy certain defined conditions with respect to identity verification may be stored as part of a security profile for a user. The security profile may be used for subsequent authentication of the user in accessing various resources and/or account operations associated with the user's data records. For example, the digital credentials may be included in a digital "wallet" (or similar software/application) and shared with other entities that request user information for the purpose of identity verification. The digital credentials may thus serve as verified claims associated with a particular user's identity.

FIG. 1 is a schematic diagram illustrating an operating environment of an example embodiment. In particular, FIG. 1 illustrates exemplary components of a computing environment 100 for managing access to a protected resource, such as a private database. As a specific example, the computing environment 100 of FIG. 1 may be implemented to facilitate controlling access to data records based on leveraging identity verification processes. The computing environment 100 includes, at least, one or more client devices 110, a resource server 160, and an identity verification system 170.

As illustrated, a resource server 160 (which may also be referred to as a server computer system) and client device 110 communicate via the network 120. The client device 110 is a computing device that may be associated with an entity having resources associated with the resource server 160. The client device 110 may take a variety of forms including, for example, a mobile communication device such as a smartphone, a tablet computer, a wearable computer such as a head-mounted display or smartwatch, a laptop or desktop computer, or a computing device of another type.

The resource server 160 may track, manage, and maintain resources, make lending decisions, and/or lend resources to the entity. The resources may, for example, be computing resources, such as memory or processor cycles. By way of further example, the resources may include stored value, such as fiat currency, which may be represented in a database. For example, the resource server 160 may be coupled to a database 161, which may be provided in secure storage. The secure storage may be provided internally within the resource server 160 or externally. The secure storage may, for example, be provided remotely from the resource server

160. For example, the secure storage may include one or more data centers. The data centers may, for example, store data with bank-grade security.

The database 161 may include data records for a plurality of accounts and at least some of the data records may define a quantity of resources associated with an entity. For example, the entity that is associated with the client device 110 may be associated with an account having one or more data records in the database 161. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated data record such as, for example, a bank balance.

In some embodiments, the resource server 160 may store account data associated with the plurality of accounts. For example, the data records of the database 161 may contain profile data (such as personal information, account settings, preference data, and the like) of users associated with the accounts that are maintained at/by the resource server 160.

The resource server 160 may, for example, be a financial institution server that is operated by a financial institution and the entity may be a customer of the financial institution.

The computing environment 100 also includes an identity verification system 170. The identity verification system 170 may comprise a platform, network, server, or other form of digital infrastructure that facilitates or performs identity verification. The identity verification system 170 implements services for verifying the identities of individuals. By way of example, the identity verification system 170 may be configured to perform document verification services. A document verification service enables verifying an individual's identity using one or more identity documents (e.g., photo ID, etc.) and the individual's biometrics (e.g., facial biometrics). For example, the identity verification system 170 may obtain a first image depicting an identity document that includes a photograph of an individual and a second image depicting the individual's face (e.g., a portrait photograph or "selfie"). The authenticity of the identity document may be verified, based on image analysis of the first image. If the identity document is determined to be authentic (i.e., it is an acceptable identity document), a comparison of the first and second images may be performed in order to verify the identity of the individual, i.e., confirm that the individual is associated with the identity document.

In some embodiments, the identity verification system 170 may output a document validity score that represents a level of authenticity of an identification document. The document validity score may be based on verification of identity information (e.g., data fields) contained in the identification document against information obtained from independent and authoritative sources, such as a credit bureau or proprietary government data. In particular, the identity verification system 170 may be capable of validating data contents of an identification document by comparing to known data sources and/or requirements and data objects associated with documents of the same type as the identification document.

Additionally, or alternatively, the identity verification system 170 may output a facial match score representing a level of similarity between an individual's facial features as depicted in the first image (of the identity document) and their facial features as depicted in the second image (e.g., a self-portrait photograph) as part of its implementation of document verification services. The individual's facial signature data may be extracted from the image data of the first and second images and the facial match score may be derived based on a comparison of the facial signature data associated with the two images.

The identity verification system 170 may output an individual's identity verification status indicating whether the identity of the individual is verified. In some embodiments, the identity verification status of an individual may be determined based on a document validity score of an acceptable identification document (e.g., government-issued ID) provided by the individual and a facial match score for the individual. For example, if the document validity score and the facial match score satisfy defined criteria (e.g., the scores exceed respective threshold values), the identity verification system 170 may determine that the individual's identity is verified.

The identity verification system 170 communicates with one or more connected computing systems. In particular, the identity verification system 170 is communicably connected to the client device 110 and the resource server 160. The identity verification system 170 may be configured to receive, from at least one of the client device 110 and the resource server 160, a request to verify the identity of an individual. In the case of documentary verification, the request may include image data for an image of an identification document and biometric data (e.g., facial biometrics) provided by the individual. The identity verification system 170 may process the request, based on the user-submitted data, and generate verification results for the individual. For example, the identity verification system 170 may perform image analysis to compare facial features as depicted in the image of the identification document and a self-portrait photograph of the individual. The verification results may be communicated to the client device 110 and/or the resource server 160, for example, as a response to the request.

The exemplary computing environment 100 of FIG. 1 illustrates the resource server 160 and the identity verification system 170 as being distinct entities. For example, the identity verification system 170 may be associated with a third-party provider of identity verification services. In some other embodiments, the resource server 160 and the identity verification system 170 may form part of a single entity. For example, the identity verification system 170 may be integrated into the resource server 160 as a component that provides identity verification (e.g., document verification) services in connection with data records/accounts that are associated with the resource server 160. The identity verification system 170 may, for example, be implemented as software modules of the resource server 160.

As described above, the client device 110, the resource server 160, and the identity verification system 170 may be computer systems. The client device 110, the resource server 160, and the identity verification system 170 may be in geographically disparate locations. Put differently, the client device 110 may be remote from the resource server 160 and/or the identity verification system 170.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
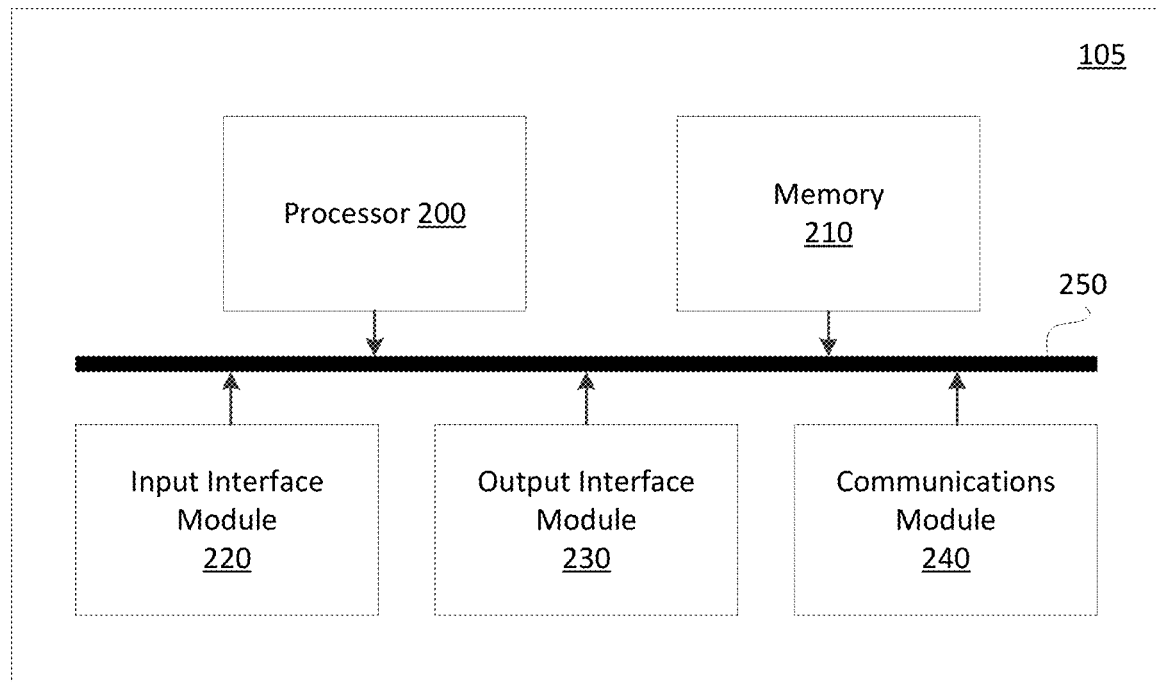
FIG. 2A is a high-level schematic diagram of an example computing device.

FIG. 2A is a high-level operation diagram of the example computing device 105. In at least some embodiments, the example computing device 105 may be exemplary of one or more of the client device 110, the resource server 160, and the identity verification system 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
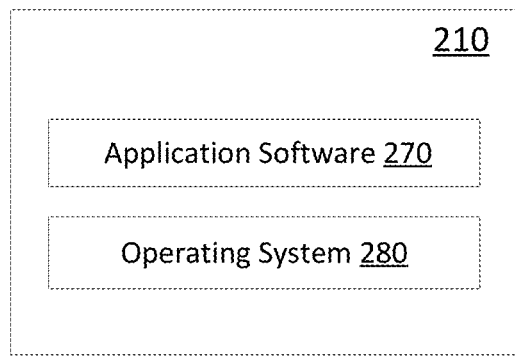
FIG. 2B shows a simplified organization of software components stored in memory of the example computing device of FIG. 2A.

FIG. 2B depicts a simplified organization of software components stored in memory 210 of the example computing device 105. As illustrated, these software components may include application software 270 and an operating system 280.

The application software 270 adapts the example computing device 105, in combination with the operating system 280, to operate as a device performing particular functions. While a single application software 270 is illustrated in FIG. 2B, in operation, the memory 210 may include more than one application software 270 and different application software 270 may perform different operations.

The operating system 280 is software. The operating system 280 allows the application software 270 to access the processor 200, the memory 210, the input interface module 220, the output interface module 230 and the communications module 240. The operating system 280 may be, for example, Apple iOS™, Google™'s Android™, Linux™, Microsoft™ Windows™, or the like.

Figure 3:
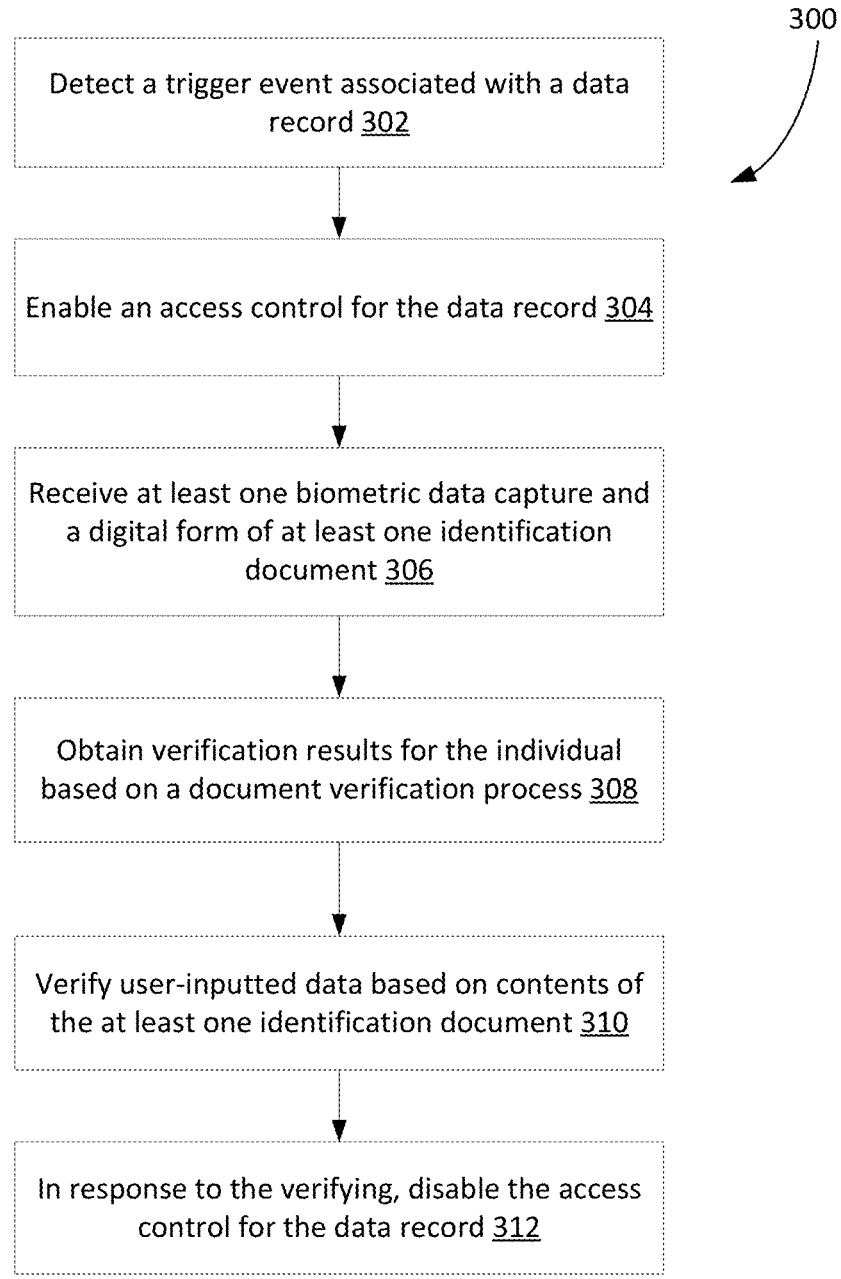
FIG. 3 shows, in flowchart form, an example method for controlling access to data records.

Reference is made to FIG. 3, which shows, in flowchart form, an example method 300 for controlling access to data records. An access control system associated with a protected resource (e.g., a private database) may manage access to a data record associated with the protected resource in accordance with the method 300. In particular, the method 300 leverages remote verification of user identities into a process for securely managing access to a user account. By way of example, access to resources, account operations, etc. for a data record associated with a user account at a protected resource may be controlled by implementing all or parts of the method 300.

Operations 302 and onward are performed by one or more processors of a computing system such as, for example, the processor 200 (FIG. 2) of a suitably configured instance of the example computing device 105 (FIG. 2). The method 300 may be performed, for example, by a server that has access to and manages data records of a plurality of user accounts. In particular, a server, such as the resource server 160, that is configured for managing access to resource accounts may perform the operations of method 300.

In operation 302, the server detects a trigger event associated with a data record. A trigger event signals to the server that an access control/restriction measure ought to be imposed on the data record. Various different trigger events may be defined for a data record. A trigger event may relate, for example, to account operations that are requested to be performed (and/or authorized) in connection with the data record. In some embodiments, a trigger event may be an unsuccessful attempt by an individual to access the data record. For example, the server may detect a trigger event when at least one failed authentication attempt is detected in connection with access of the data record. A failed authentication attempt may be a result of inputting, for example, an incorrect password, an incorrect combination of username and password, a non-existent username, etc. upon being prompted for login credentials for accessing the data record.

In some embodiments, a trigger event may include receiving a request to generate at least one new data record for an individual. For example, the server may receive a request, by an individual, to open a new user account. A new user account may, in turn, be associated with one or more new data records. If the server receives such a request to generate a new data record, a trigger event may be detected.

In some embodiments, a trigger event may include an account-related action associated with the data record that is initiated by an individual satisfying a defined location criterion. The location criterion may relate, for example, to a current location of the individual relative a defined first location. The first location may be a defined geographical region associated with the server (e.g., a country/state/city in which the server is located or headquartered). The location criterion may indicate one or more rules specifying a relationship between the current location of the individual and the first location. If the rules are determined to be satisfied, the server may detect a trigger event. For example, if the individual (or a device associated with the individual) is currently located in a country different from that of the first location, the trigger event may be detected by the server.

In response to detecting at least one defined trigger event, the server enables an access control for the data record, in operation 304. More specifically, the server implements an access restriction on the data record. The access control defines one or more restrictions on accessing the data record. In particular, the access control may define restrictions on account operations, access to resources, etc. in connection with the data record. For example, the access control may include a temporary restriction on accessing at least a subset of all features associated with the data record.

In at least some embodiments, the defined trigger events may be associated with different access controls. That is, the access control(s) which may be imposed on the data record may depend on the specific trigger event that is detected by the server. For example, each defined trigger event may be associated with a respective set of features of the data record that are disabled (or locked, etc.) by the server when the access controls are enabled. The server may store, or have access to, a mapping of trigger event types to access restriction measures, and the imposition of access controls on the data record may be performed based on the mapping. In particular, upon detecting a trigger event, the server may impose all or a subset of the access restriction measures to which the detected trigger event is mapped.

Once the appropriate access controls are enabled by the server, the individual requesting access to the data record may be prompted to provide information that is required for disabling the access controls. Specifically, the requesting individual is prompted to submit data for use in a document verification process. For example, the server may cause to be displayed, via a user interface on a client device associated with the requesting individual, a prompt to submit biometric data and a specific identification document. In operation 306, the server receives at least one biometric data capture and a digital form of at least one identification document. The identification document is one of a set of one or more acceptable documents that contains a photograph of the individual. The biometric data capture may include a facial image capture and the digital form may include a scanned copy (or photograph, or other electronic copy) of the at least one identification document. For example, the biometric data capture may be in the form of a self-portrait photograph. The biometric data capture and the digital form may be provided via the individual's device. In particular, a self-portrait photograph and a photograph depicting an identification document (including the individual's facial image) may be taken using built-in cameras of the device and submitted through a user interface that is accessible on the device.

In operation 308, the server obtains verification results representing an identity verification status for the individual. The verification results are obtained based on a document verification process using the at least one biometric data capture and the digital form of the identification document submitted by the individual. In at least some embodiments, the server requests the document verification to be processed by an external service. That is, the server may request a third-party service to perform document verification based on the user-submitted data (i.e., image data). The server may transmit, to an external document verification system, the biometric data capture and the digital form of the identification document (for example, as part of the request to perform document verification). The verification results may be received by the server from the document verification system.

In at least some embodiments, the verification results may include an indicator representing the identity verification status of the individual. For example, the indicator may be a status flag (or similar indication) of whether the individual is verified or not verified. That is, the indicator may comprise a value of a binary variable of verification status.

In some embodiments, the verification results may include results data associated with the document verification process. In particular, the server may receive a set of values representing results of the document verification process, rather than just a value of a binary variable. For example, the verification results may include a document validity score (or similar numerical authentication score) associated with the at least one identification document submitted by the individual to the document verification system. As another example, the verification results may include a facial match score which may be calculated based on a comparison of facial features in the images (e.g., a self-portrait photo and a photo of the identification document) submitted by the individual.

The individual's identity may be determined to be verified if the verification results of the document verification process satisfy certain defined conditions. By way of example, if the verification results include a document validity score for the identification document and a facial match score for the individual, the scores may be compared to defined threshold values. If both scores are determined to exceed their respective thresholds, the individual may be determined to be verified, i.e., the identification document is authentic and the individual can be trusted to be associated with the identification document. Other rules and/or conditions may be defined for determining when the identity of the individual is verified.

In response to determining that the verification results satisfy defined conditions, the server verifies user-inputted data based on contents of the at least one identification document, in operation 310. In particular, the server may perform document comparison based on the at least one identification document and previously stored customer profile data (e.g., personal information, account and preference settings, etc.) associated with the data record. The user-inputted data may be verified if the document contents of the identification document match the stored customer profile data.

Upon verifying the user-inputted data, the server selectively disables the access control for the data record, in operation 312. In at least some embodiments, the server may identify a subset of access restrictions that are imposed on the data record to disable. The verification of the individual's identity may only suffice for disabling some, but not all, of the access controls that are imposed upon detecting a defined trigger event. The server may determine which of the access controls, or restriction measures, can be disabled, thereby granting access to the features of the data record that are associated with the access controls. In some embodiments, the selection of access controls to disable for the data record may be based on the verification results. In particular, the scores included in the verification results (e.g., document validity score, facial similarity score, etc.) may be used for determining whether all or only a subset of the access controls should be disabled. For example, if the verification scores exceed their respective thresholds by more than a defined margin (indicating strong verification of identity), a higher number of the access controls may be disabled for the data record (in comparison to disabling of access controls for lower verification scores).

Figure 4:
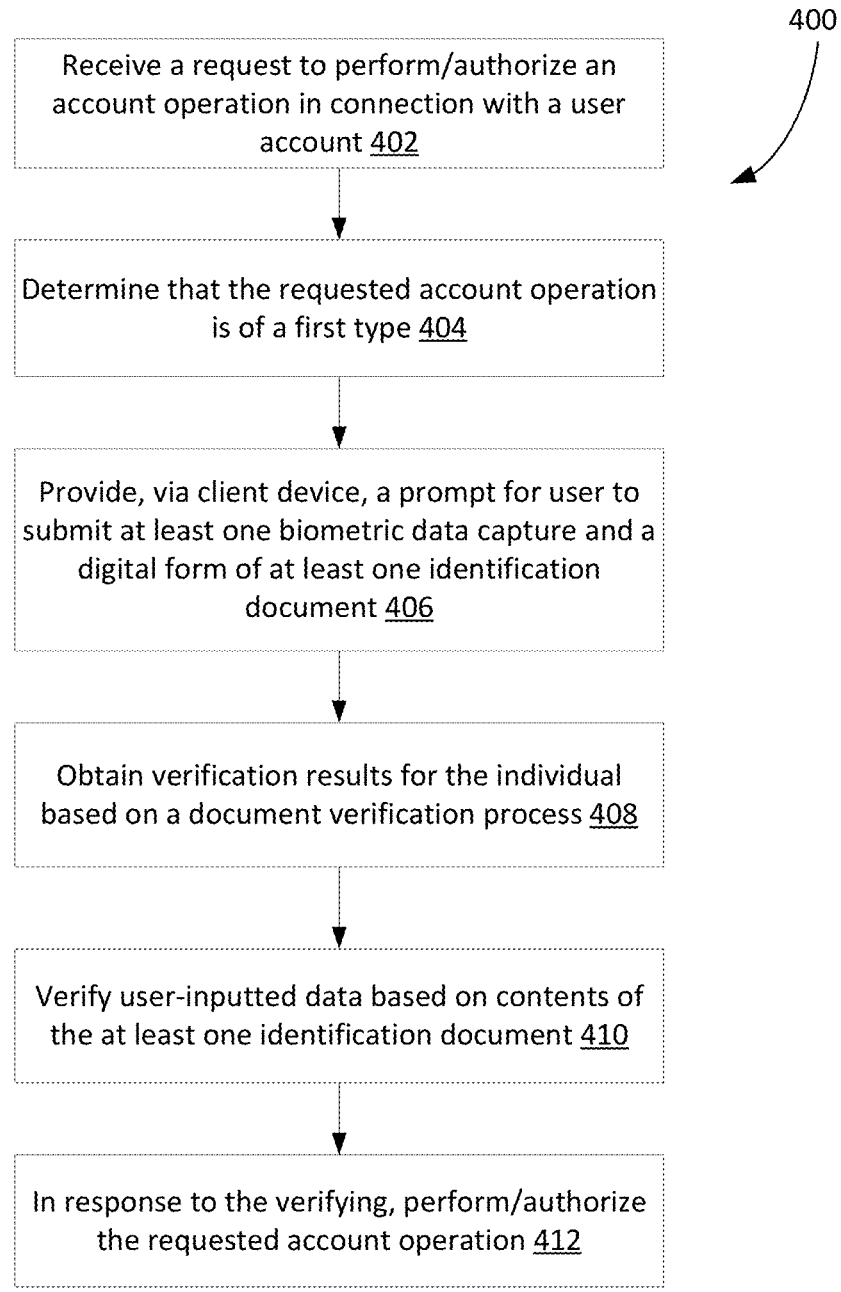
FIG. 4 shows, in flowchart form, an example method for processing requests to authorize account operations in connection with user accounts.

Reference is made to FIG. 4, which shows, in flowchart form, an example method 400 for processing requests to authorize account operations in connection with user accounts at a protected resource. An access control system associated with a protected resource (e.g., a private database) may manage access to data records associated with the protected resource in accordance with the method 400. By way of example, access to resources, account operations, etc. for data records associated with user accounts at a protected resource may be controlled by implementing all or parts of the method 400.

Operations 402 and onward are performed by one or more processors of a computing system such as, for example, the processor 200 (FIG. 2) of a suitably configured instance of the example computing device 105 (FIG. 2). The method 400 may be performed, for example, by a server that has access to and manages data records of a plurality of resource accounts. In particular, a server that is configured for managing access to resource accounts, such as the resource server 160, may implement the method 400. The operations of method 400 may be performed in addition to, or as alternatives of, one or more of the operations of method 300.

In operation 402, the server receives a request to perform and/or authorize an account operation in connection with a user account. The request may be received, for example, from a device of an individual attempting to access an account at a protected resource, such as a private database. An account operation may be a resource transfer, data access, settings or preference update, etc. associated with a specific user account. In some embodiments, the request may only be processed upon successful login to the user account. That is, the server may only process the request if it is submitted after a successful login to an account session of the user account.

In operation 404, the server determines that the requested account operation is of a first type. In particular, the requested account operation may be determined to be of a type requiring additional, or stronger, authentication of the requesting entity. For example, the account operation may be an operation that accesses (or exposes, modifies, etc.) sensitive information associated with the user account. The sensitive information may, for example, be confidential data, personal information, and the like, that is stored in association with the user account. As another example, the account operation may be an operation that is initiated from a geographical region satisfying a defined location criterion. In particular, the operation may be one that is initiated by an individual residing, or currently located, in a foreign country.

The types of account operations requiring additional authentication may be predefined. For example, the server may store the plurality of account operations that are available for performing in connection with user accounts (and their associated data records) as well as the required authentication levels for those account operations.

Upon determining that the requested account operation is of the first type, the server provides, via the client device, a prompt for the requesting individual to submit at least one biometric data capture of the individual and a digital form of at least one identification document, in operation 406. The submitted data is subsequently provided to a document verification process for verifying the identity of the requesting individual. The identification document may be one of a set of acceptable documents for the document verification process. In at least some embodiments, the biometric data capture may comprise a self-portrait photograph of the individual and the digital form may be an electronic copy (e.g., scanned copy, photograph, etc.) of the identification document that includes a photograph of the individual's face.

The image data is submitted to a document verification process, which may be performed by the server or communicated to an external third-party service. For example, the user-submitted data may be included in a request to a third-party document verification system to verify the identity of the individual requesting access to the account operation.

In operation 408, the server obtains verification results based on the document verification process. The verification results may represent an identity verification status of the requesting individual. In at least some embodiments, the verification results may include result data indicating an authenticity of the identification document and/or similarity between facial features as depicted in the images submitted by the individual to the document verification process. For example, the verification results may include one or both of a document validity score for the identification document and a facial match score for the individual.

Upon obtaining the verification results, the server makes a determination of whether the identity of the individual is verified. In particular, the server determines whether the verification results satisfy defined conditions for accepting the individual's identity as being verified. For example, the verification scores (e.g., document validity score, facial match score, etc.) may be compared to their respective defined thresholds. If both verification scores exceed their thresholds, the identity of the individual may be determined to be verified based on the document verification process.

In operation 410, the server verifies user-inputted data based on contents of the at least one identification document. In particular, the server may perform document comparison based on the at least one identification document and previously stored customer profile data (e.g., personal information, account and preference settings, etc.) associated with the data record. The user-inputted data may be verified if the document contents of the identification document match the stored customer profile data In operation 412, the server performs (and/or authorizes) the requested account operation in response to verifying the user-inputted data. Specifically, the server determines that the additional authentication comprising the document verification of the requesting individual is sufficient for granting access to the requested account operation. The requested access (either for the server to perform the account operation or authorize the operation) is granted to the individual.

Figure 5:
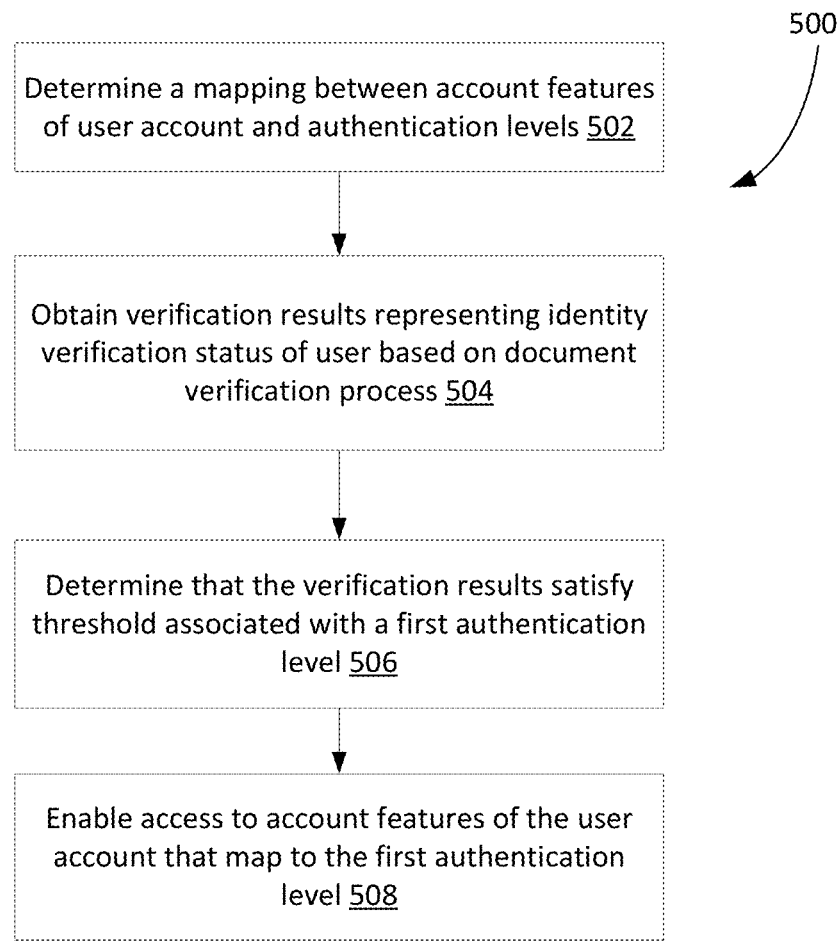
FIG. 5 shows, in flowchart form, another example method for controlling access to data records.

Reference is made to FIG. 5, which shows, in flowchart form, another example method 500 for controlling access to data records. An access control system associated with a protected resource (e.g., a private database) may manage access to data records associated with the protected resource in accordance with the method 400. By way of example, access to resources, account operations, etc. for data records associated with user accounts at a protected resource may be controlled by implementing all or parts of the method 400.

Operations 502 and onward are performed by one or more processors of a computing system such as, for example, the processor 200 (FIG. 2) of a suitably configured instance of the example computing device 105 (FIG. 2). The method 500 may be performed, for example, by a server that has access to and manages data records of a plurality of resource accounts. In particular, a server that is configured for managing access to resource accounts, such as the resource server 160, may implement the method 500. The operations of method 500 may be performed in addition to, or as alternatives of, one or more operations of methods 300 and 400. For example, the method 500 may be integrated as a sub-process of one or both of methods 300 and 400.

In some embodiments, the requests to access a data record may be processed by first determining an assurance, or authentication, level associated with a requesting entity. More specifically, the features of a data record to which access may be granted for an entity may be determined based on an authentication level of the entity. By determining the entity's authentication level, the set of features that are accessible by the entity may be determined expediently, without having to independently process each request to access different features of the set.

The server may first determine a mapping between account features of a user account at a protected resource and authentication (or assurance) levels, in operation 502. For example, a plurality of different authentication levels may be defined, each authentication level corresponding to a level of trust assigned to an entity with said authentication level. The set of account features of the user account (and one or more associated data records) may be mapped to the defined authentication levels. That is, the account features (e.g., available account operations, settings and preferences, etc.) may each be associated with at least one authentication level.

When an individual requests access to the user account, the identity of the individual may be verified. In at least some embodiments, the server may process a document verification that is based on information submitted by the individual. For example, the server may prompt the individual to submit biometric data (e.g., a selfie) and a photograph depicting an acceptable identification document. The submitted data may be provided to a document verification service, such as a third-party identity verification system, as part of a request to verify the individual's identity.

The server subsequently obtains verification results representing an identity verification status of an individual, in operation 504. As explained above, in some embodiments, the verification results may include results data such as verification scores (e.g., document validity score, facial match score, etc.). Specifically, the verification results may indicate an authenticity of the identification document submitted by the individual and a match between the facial features as depicted in the images provided by the individual.

In operation 506, the server determines that the verification results satisfy defined conditions associated with a first authentication level. That is, the server may determine that the verification of the individual's identity is sufficiently trustworthy such that the first authentication level may be assigned to the individual. In some embodiments, the conditions may relate to the verification scores. For example, if both of the document validity score and the facial match score are sufficiently high (i.e., exceed their respective thresholds by more than a defined amount), the verification results may be determined to satisfy the conditions for assigning the first authentication level to the individual.

In operation 508, the server enables access to account features of the user account that map to the first authentication level for the requesting individual. In particular, a first set of account features associated with the first authentication level may automatically be made accessible to the individual. In other words, the individual need not undergo identity verification each time they attempt to access the account features of the first set—access is automatically granted by virtue of the individual being associated with the first authentication level.

More generally, access to account features of a user account, and associated data records, may be granted in bulk by first assigning a suitable authentication level to a requesting individual. Once an authentication level for an individual is determined, the set of permissible account features for that authentication level may automatically be granted to the individual by the server, without independently verifying the identity of the individual every time access is desired.

Figure 6:
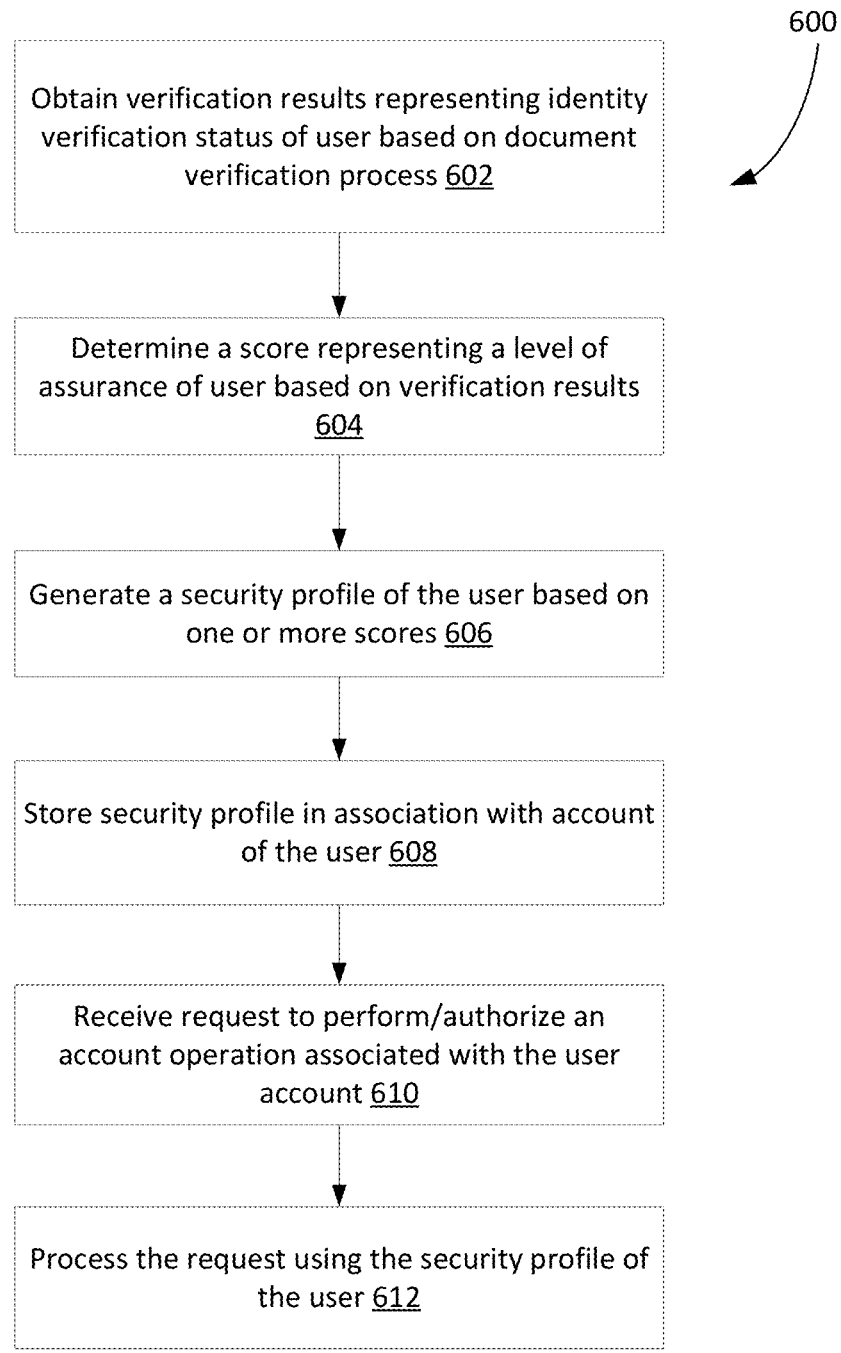
FIG. 6 shows, in flowchart form, an example method for managing a security profile that is generated based on an identity verification process.

Reference is made to FIG. 6, which shows, in flowchart form, an example method 600 for managing a security profile that is generated based on an identity verification process. An access control system associated with a protected resource (e.g., a private database) may manage access to data records associated with the protected resource in accordance with the method 600. By way of example, access to resources, account operations, etc. for data records associated with user accounts at a protected resource may be controlled by implementing all or parts of the method 600.

Operations 602 and onward are performed by one or more processors of a computing system such as, for example, the processor 200 (FIG. 2) of a suitably configured instance of the example computing device 105 (FIG. 2). The method 600 may be performed, for example, by a server that has access to and manages data records of a plurality of resource accounts. In particular, a server that is configured for managing access to resource accounts, such as the resource server 160, may implement the method 600. The operations of method 600 may be performed in addition to, or as alternatives of, one or more operations of methods 300, 400 and 500.

An individual typically possesses multiple identification documents (e.g., driver's license, health cards, etc.). These credentials represent opportunities for verified claims about the individual. In particular, each credential (physical ID or digital credential) of an individual can be used for verifying the individual's identity. These credentials, or "verified claims", of an individual may be used in creating a trusted identity, or security profile, for the individual, which may be leveraged when adjudicating various access requests of the individual.

When an individual requests access to a user account, or if the server detects certain defined trigger events requiring additional authentication, the identity of the individual may be verified. In operation 602, the server obtains verification results representing an identity verification status of the requesting individual based on a document verification process. In particular, the individual may be subjected to document verification. For example, the server may prompt the individual to provide image data depicting an acceptable identification document and a self-portrait photograph. The user-submitted document is then processed by a document verification system (either integral to the server or a third-party service), and verification results may be obtained based on the document verification.

In operation 604, the server determines an assurance score representing a level of assurance of the individual based on the verification results. The assurance score is specifically associated with the identity document submitted by the individual. That is, the assurance score reflects the level of assurance that can be ascertained using the specific identification document. Other documents, or credentials, may be associated with their respective assurance scores. More generally, each credential of the individual may have a unique associated assurance score that reflects the level of assurance, determined through document verification, that is based on the credential.

In some embodiments, the assurance score may be a weighted combination of a plurality of verification scores, such as the document validity score and the facial match score. The assurance score for each credential may be derived using the same weighted calculation. In particular, the server may calculate assurance scores for various different credentials for the individual, by calculating the assurance scores using the same weightings of verification scores.

In operation 606, the server generates a security profile of the individual based on one or more assurance scores. The server may, for example, compile the assurance scores associated with a plurality of credentials for the individual and store the scores in a security profile assigned to the individual. The assurance scores may be calculated as the server processes document verification for the individual using different credentials, or identification documents. Over time, as the server processes various different access requests initiated by the individual, the server may compile historical verification results data of document verification using a plurality of different credentials of the individual. The security profile may thus represent valid results of historical identity (e.g., document) verification processes performed based on credentials data submitted by the individual. The assurance scores for the credentials can be calculated based on the historical verification results data.

In operation 608, the server stores the security profile in association with an account of the individual. The security profile may be stored, by the server, as part of account data associated with the individual's account. In some embodiments, the security profile and/or the digital credentials associated therewith may be stored in a digital wallet (or other application) associated with the individual. For example, upon generating or updating the security profile, the server may transmit the security profile data (e.g., a digital copy of the security profile) to a digital wallet of the individual. The digital wallet may, for example, be stored on a device associated with the individual, and so the security profile data may be sent to the individual's device for storage thereon.

In operation 610, the server receives a request to perform and/or authorize an account operation associated with the user account. The account operation may, for example, be a resource transfer, settings or preference update, or other account-related activity that is initiated by the individual. The server processes the request using the security profile of the individual, in operation 612. For example, the request may include the security profile from a digital wallet of the requesting individual. The request is processed without an independent document verification (or other identity verification). Instead, the server leverages the security profile provided by the individual in determining whether access to the requested operation should be granted.

The security profile of the individual may be continuously updated by the server. In particular, new assurance scores may be added to the security profile as different credentials are used for authenticating the individual in connection with the user account. Existing assurance scores for various credentials may also be dynamically updated based on further identity verification processes performed based on said credentials.

In at least some embodiments, the security profile may be used in adjudicating access requests that are unrelated to the individual's account. That is, the security profile may, for example, be shared with other entities that attempt to determine a level of assurance of the individual. In this way, the security profile of the individual may serve as an access token that incorporates historical verification results data in connection with a plurality of different credentials of the individual.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor;
a communications module coupled to the processor; and
a memory coupled to the processor, the memory storing instructions that, when executed, configure the processor to:
  detect a trigger event associated with a data record;
  in response to detecting the trigger event, enable an access control for the data record, wherein the trigger event is associated with a respective set of restrictions on accessing the data record and wherein enabling the access control comprises imposing the set of restrictions associated with the detected trigger event;
  receive at least one biometric data capture for a user and a digital form of at least one identification document associated with the user;
  obtain verification results representing an identity verification status of the user based on a document verification process using the at least one biometric data capture and the digital form;
  in response to determining that the verification results satisfy first conditions:

verify user-inputted data based on contents of the at least one identification document; and in response to the verifying, selectively disable the access control for the data record by disabling a first subset of the imposed restrictions on the data record, wherein selection of the first subset depends on the verification results.

2. The computing system of claim 1, wherein the at least one biometric data capture comprises a facial image capture and wherein the digital form comprises a scan of the at least one identification document.

3. The computing system of claim 1, wherein detecting the trigger event comprises detecting at least one unsuccessful authentication attempt in connection with access of the data record.

4. The computing system of claim 1, wherein obtaining the verification results comprises:
transmitting, to a remote document verification system, the at least one biometric data capture and the digital form; and
receiving, from the remote document verification system, an indicator representing the identity verification status of the user.

5. The computing system of claim 4, wherein the indicator comprises a numerical authentication score associated with the at least one identification document and wherein determining that the verification results satisfy first conditions comprises determining that the numerical authentication score exceeds a defined threshold value.

6. The computing system of claim 1, wherein the access control comprises a temporary restriction on accessing at least a subset of all features associated with the data record.

7. The computing system of claim 1, wherein the trigger event comprises receiving a request to generate a new data record for an entity that satisfies a defined location criterion.

8. The computing system of claim 7, wherein the defined location criterion relates to a current location associated with the entity relative to a defined first location.

9. The computing system of claim 1, wherein verifying user-inputted data based on contents of the at least one identification document comprises performing document comparison based on the at least one identification document and previously stored customer profile data associated with the data record.

10. The computing system of claim 1, wherein the verification results comprise a document validity score and a facial similarity score and wherein selecting the first subset of the imposed restrictions comprises comparing the document validity score and the facial similarity score with respective thresholds.

11. A computer-implemented method, comprising:
detecting a trigger event associated with a data record;
in response to detecting the trigger event, enable an access control for the data record, wherein the trigger event is associated with a respective set of restrictions on accessing the data record and wherein enabling the access control comprises imposing the set of restrictions associated with the detected trigger event;
receiving at least one biometric data capture for a user and a digital form of at least one identification document associated with the user;
obtaining verification results representing an identity verification status of the user based on a document verification process using the at least one biometric data capture and the digital form;
in response to determining that the verification results satisfy first conditions:
verifying user-inputted data based on contents of the at least one identification document; and
in response to the verifying, selectively disabling the access control for the data record by disabling a first subset of the imposed restrictions on the data record, wherein selection of the first subset depends on the verification results.

12. The method of claim 11, wherein the at least one biometric data capture comprises a facial image capture and wherein the digital form comprises a scan of the at least one identification document.

13. The method of claim 11, wherein detecting the trigger event comprises detecting at least one unsuccessful authentication attempt in connection with access of the data record.

14. The method of claim 11, wherein obtaining the verification results comprises:
transmitting, to a remote document verification system, the at least one biometric data capture and the digital form; and
receiving, from the remote document verification system, an indicator representing the identity verification status of the user.

15. The method of claim 14, wherein the indicator comprises a numerical authentication score associated with the at least one identification document and wherein determining that the verification results satisfy first conditions comprises determining that the numerical authentication score exceeds a defined threshold value.

16. The method of claim 11, wherein the access control comprises a temporary restriction on accessing at least a subset of all features associated with the data record.

17. The method of claim 11, wherein the trigger event comprises receiving a request to generate a new data record for an entity that satisfies a defined location criterion.

18. The method of claim 17, wherein the defined location criterion relates to a current location associated with the entity relative to a defined first location.

19. The method of claim 11, wherein verifying user-inputted data based on contents of the at least one identification document comprises performing document comparison based on the at least one identification document and previously stored customer profile data associated with the data record.

20. The method of claim 11, wherein the verification results comprise a document validity score and a facial similarity score and wherein selecting the first subset of the imposed restrictions comprises comparing the document validity score and the facial similarity score with respective thresholds.

* * * * *